(12) United States Patent
Simonneau et al.

(10) Patent No.: US 11,607,939 B2
(45) Date of Patent: Mar. 21, 2023

(54) POWERED CARGO COVER FOR VEHICLE

(71) Applicants: INTEVA FRANCE, Sully sur Loire (FR); TREVES PRODUCTS, SERVICES & INNOVATION, Paris (FR)

(72) Inventors: Eric Simonneau, Vienne en Val (FR); Alicia Hélène Lecomte, Villers-Franqueux (FR); Eric Maurice Adam, Berru (FR)

(73) Assignees: INTEVA FRANCE, Sully-sur-Loire (FR); TREVES PRODUCTS, SERVICES & INNOVATION, Paris (FR)

( * ) Notice: Subject to any disclaimer, the term of this patent is extended or adjusted under 35 U.S.C. 154(b) by 284 days.

(21) Appl. No.: 16/887,672

(22) Filed: May 29, 2020

(65) Prior Publication Data

US 2020/0376942 A1    Dec. 3, 2020

(30) Foreign Application Priority Data

May 31, 2019    (FR) ...................................... 1905817

(51) Int. Cl.
  *B60J 7/14*     (2006.01)
  *E05F 15/643*   (2015.01)
  *E05F 15/655*   (2015.01)
  *B60J 7/19*     (2006.01)

(52) U.S. Cl.
  CPC ............ *B60J 7/141* (2013.01); *E05F 15/643* (2015.01); *E05F 15/655* (2015.01); *B60J 7/19* (2013.01); *E05Y 2900/548* (2013.01)

(58) Field of Classification Search
  CPC .. B60J 7/141; B60J 7/19; E05F 15/643; E05F 15/655; E05Y 2900/548; B60R 5/044
  USPC ...................................... 296/100.04
  See application file for complete search history.

(56) References Cited

U.S. PATENT DOCUMENTS

| | | | | |
|---|---|---|---|---|
| 3,699,580 A | * | 10/1972 | Joseph | H01Q 1/20 343/702 |
| 4,956,939 A | * | 9/1990 | Kuhlman | E05F 15/627 24/667 |
| 5,131,894 A | * | 7/1992 | Hilker | F16D 1/06 403/326 |
| 6,113,301 A | * | 9/2000 | Burton | F16C 11/0604 403/348 |
| 6,196,755 B1 | * | 3/2001 | Okorocha | H04N 9/3141 403/313 |
| 6,416,103 B1 | | 7/2002 | Laudenbach et al. | |

(Continued)

FOREIGN PATENT DOCUMENTS

| | | | | |
|---|---|---|---|---|
| CN | 1619091 B | * | 12/2010 | ............ B60J 1/2027 |
| CN | 103122747 A | * | 5/2013 | ............ B60J 1/2044 |

(Continued)

OTHER PUBLICATIONS

European Search Report for Application No. 1905817.
Written Opinion for Application No. 1905817.

*Primary Examiner* — Hilary L Gutman
(74) *Attorney, Agent, or Firm* — Cantor Colburn LLP (57) ABSTRACT

A two piece cursor for use with an opening and closing mechanism for a powered cargo cover of a vehicle. The two piece cursor having: a main body portion; and a nozzle portion, wherein the nozzle portion is removably secured to the main body portion.

10 Claims, 12 Drawing Sheets

(56) References Cited

U.S. PATENT DOCUMENTS

| | | | |
|---|---|---|---|
| 6,457,897 B1* | 10/2002 | Stangier | F16B 37/02 |
| | | | 403/379.2 |
| 9,346,406 B2 | 5/2016 | Rodriguez et al. | |
| 10,457,219 B2* | 10/2019 | Bilandzija | B60R 5/047 |
| 2012/0110912 A1* | 5/2012 | Panozzo | E05F 15/643 |
| | | | 49/360 |
| 2019/0009656 A1 | 1/2019 | Renz et al. | |
| 2019/0054861 A1* | 2/2019 | Gasca Fuentes | B60R 5/044 |
| 2019/0225158 A1* | 7/2019 | Loewe | B60R 5/044 |
| 2022/0010605 A1* | 1/2022 | Hernandez Covarrubias | |
| | | | E05D 7/10 |

FOREIGN PATENT DOCUMENTS

| | | | | |
|---|---|---|---|---|
| CN | 103643885 A * | 3/2014 | ............ | B60J 1/2041 |
| CN | 105313649 A * | 2/2016 | ............ | B60J 1/2027 |
| DE | 102006053680 A1 * | 5/2008 | ............ | B60J 1/2027 |
| DE | 102007058262 A1 | 5/2009 | | |
| DE | 102015118171 A1 | 4/2016 | | |
| EP | 1084907 A2 | 3/2001 | | |
| EP | 1243474 A2 * | 9/2002 | ............ | B60R 5/047 |
| EP | 1862339 A1 | 12/2007 | | |
| EP | 1950090 A1 * | 7/2008 | ............ | B60R 5/047 |
| EP | 2062780 A1 * | 5/2009 | ............ | B60R 5/047 |
| EP | 3427984 A1 | 1/2019 | | |
| FR | 2656165 A1 * | 6/1991 | ............ | B60R 5/047 |
| FR | 2925102 A1 * | 6/2009 | ............ | B60J 7/0015 |
| WO | WO-2007059943 A1 * | 5/2007 | ............ | B60R 5/047 |

\* cited by examiner

POWERED CARGO COVER FOR VEHICLE

CROSS REFERENCE TO RELATED APPLICATIONS

This application claims priority under 35 U.S.C. § 119 to the following French Patent Application No. FR 19/05817 filed on May 31, 2019, the entire contents of which are incorporated herein by reference thereto.

BACKGROUND

Exemplary embodiments of the present disclosure pertain to the art of powered cargo covers for use in vehicles.

Power cargo covers employ a motor that drives a cursor that moves the cover between a closed positon and an open position.

Accordingly, it is desirable to provide improvements to the system that opens and closes the cargo cover.

BRIEF DESCRIPTION

Disclosed is a two piece cursor for use with a powered cargo cover of a vehicle. The two piece cursor having: a main body portion; and a nozzle portion, wherein the nozzle portion is removably secured to the main body portion.

In addition to one or more of the features described above, or as an alternative to any of the foregoing embodiments, the main body portion is separately secured to a rail.

In addition to one or more of the features described above, or as an alternative to any of the foregoing embodiments, the nozzle portion can be removed from the main body portion without completely removing the cursor from the rail.

In addition to one or more of the features described above, or as an alternative to any of the foregoing embodiments, the nozzle portion is configured to pivotally receive a portion of a moveable end of the powered cargo cover.

In addition to one or more of the features described above, or as an alternative to any of the foregoing embodiments, the nozzle portion engages the main body portion of the cursor via a "snap fit" or interference type of engagement.

In addition to one or more of the features described above, or as an alternative to any of the foregoing embodiments, the nozzle portion has an engagement portion that has a feature that releasably engages a tab of the main body portion when the engagement portion is inserted into an opening of the main body portion of the cursor.

In addition to one or more of the features described above, or as an alternative to any of the foregoing embodiments, the nozzle portion has a cover engagement portion that defines a receiving area configured to pivotally receive a portion of the powered cargo cover.

In addition to one or more of the features described above, or as an alternative to any of the foregoing embodiments, the cover engagement portion includes a pair of opposing walls each having a curved surface for pivotally receiving a portion of the cover.

In addition to one or more of the features described above, or as an alternative to any of the foregoing embodiments, the nozzle portion further comprises an opening that extends into and from the receiving area, the opening allows the tab to be dislodged from the feature via a tool that is inserted into the opening when the nozzle portion is secured to the main body portion.

In addition to one or more of the features described above, or as an alternative to any of the foregoing embodiments, the nozzle portion is secured to the main body portion via a screw.

Also disclosed is an opening and closing mechanism for a powered cargo cover, the opening and closing mechanism including: a rail; a two piece cursor as in any of the preceding claims slidably mounted to the rail; and a motor for moving the cursor along the rail, wherein movement of the cursor along the rail moves the powered cargo cover between an open position and a closed position.

In addition to one or more of the features described above, or as an alternative to any of the foregoing embodiments, the powered cargo cover is foldable about a hinge portion.

In addition to one or more of the features described above, or as an alternative to any of the foregoing embodiments, the cursor slides along the rail due to a cable or cables secured to the cursor.

In addition to one or more of the features described above, or as an alternative to any of the foregoing embodiments, a speed of the motor during opening and closing of the powered cargo cover is controlled via pulse width modulation.

In addition to one or more of the features described above, or as an alternative to any of the foregoing embodiments, the powered cargo cover is located at a rear portion of a vehicle.

In addition to one or more of the features described above, or as an alternative to any of the foregoing embodiments, an overstroke to the motor is applied to create a tensile force in the cover to prevent rattling or vibration of the cover when it is in the closed positon.

BRIEF DESCRIPTION OF THE DRAWINGS

The following descriptions should not be considered limiting in any way. With reference to the accompanying drawings, like elements are numbered alike.

DETAILED DESCRIPTION

As will be described herein and in at least one embodiment of the present disclosure is directed to a powered cargo cover for use in vehicles.

Figure 1:
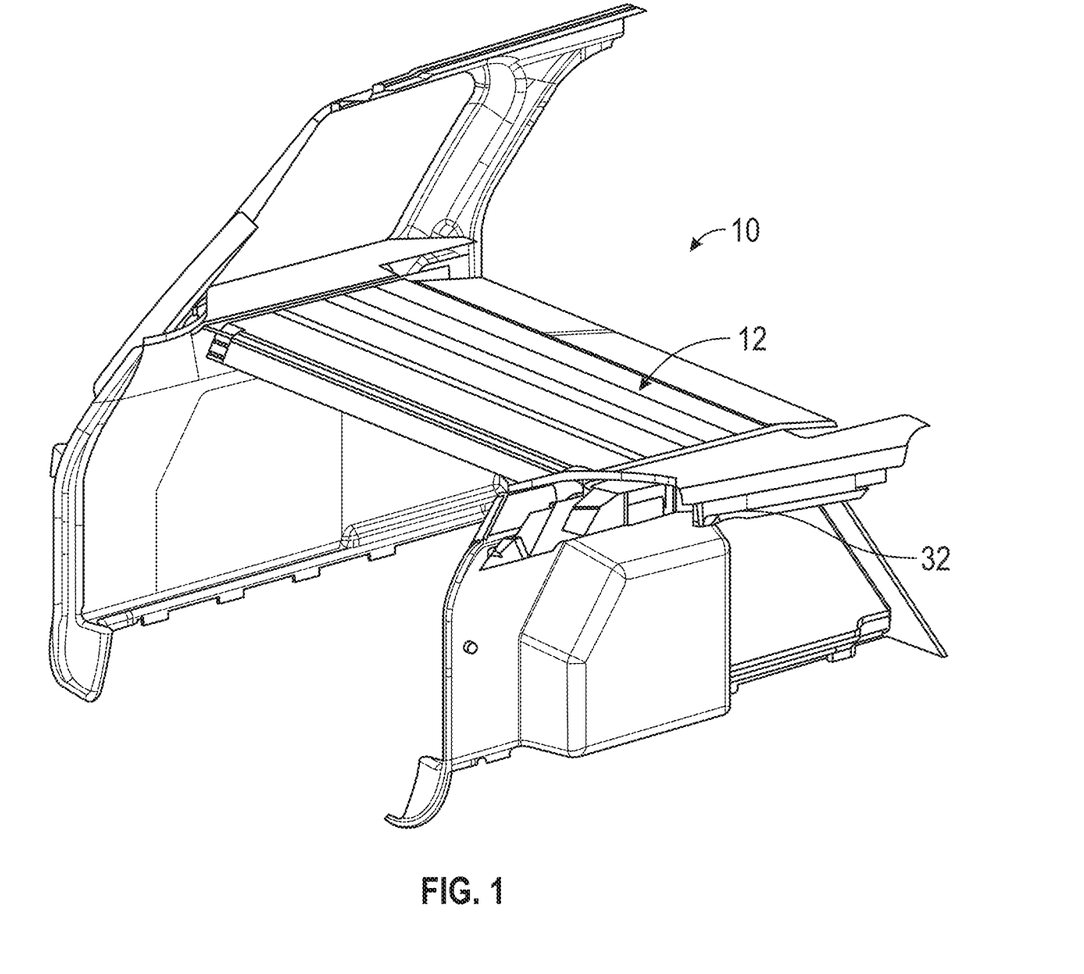
FIG. 1 is a perspective view of a rear portion of a vehicle with a powered cargo cover in accordance with an embodiment of the present disclosure.
Figure 2:
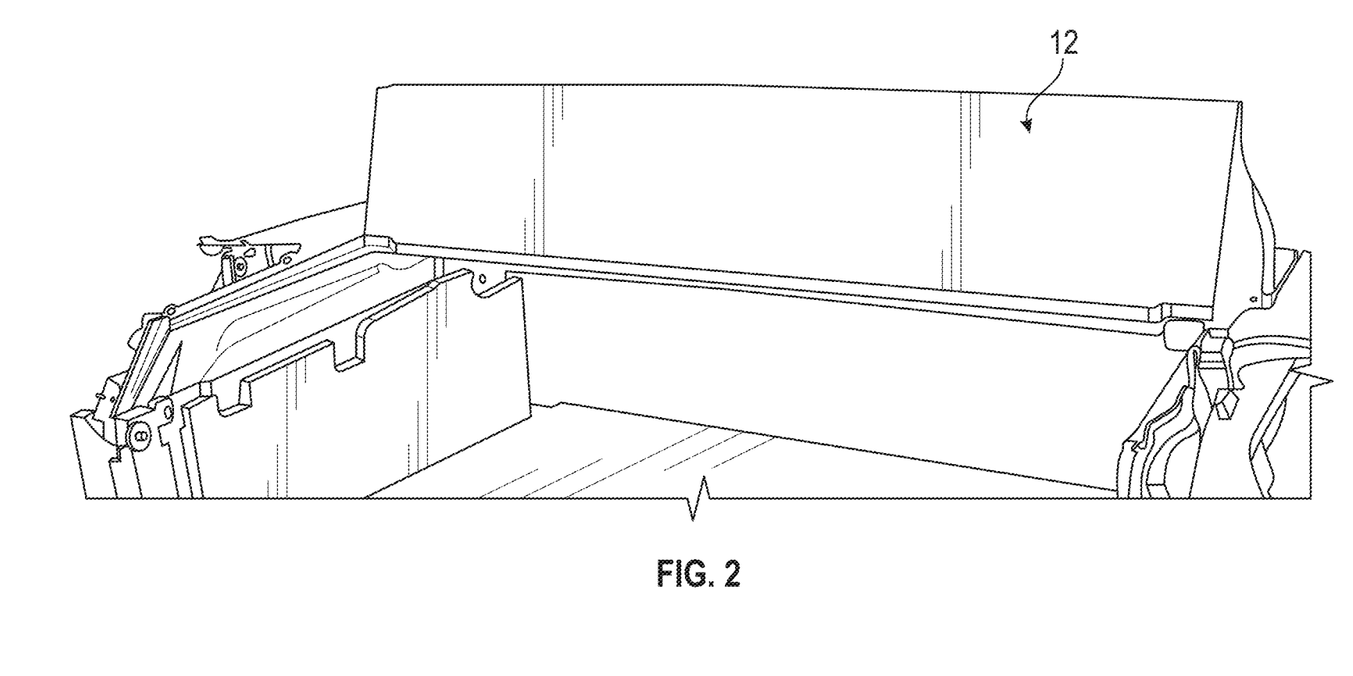
FIG. 2 is a view illustrating the powered cargo cover in an open position.
Figure 3A:
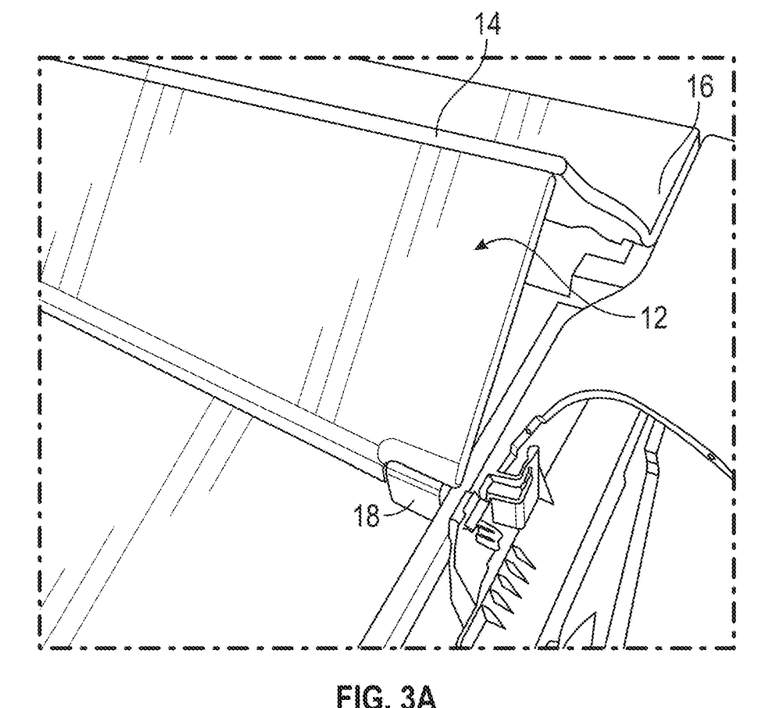
FIG. 3A is view of a portion of the powered cargo cover in an open position.
Figure 3B:
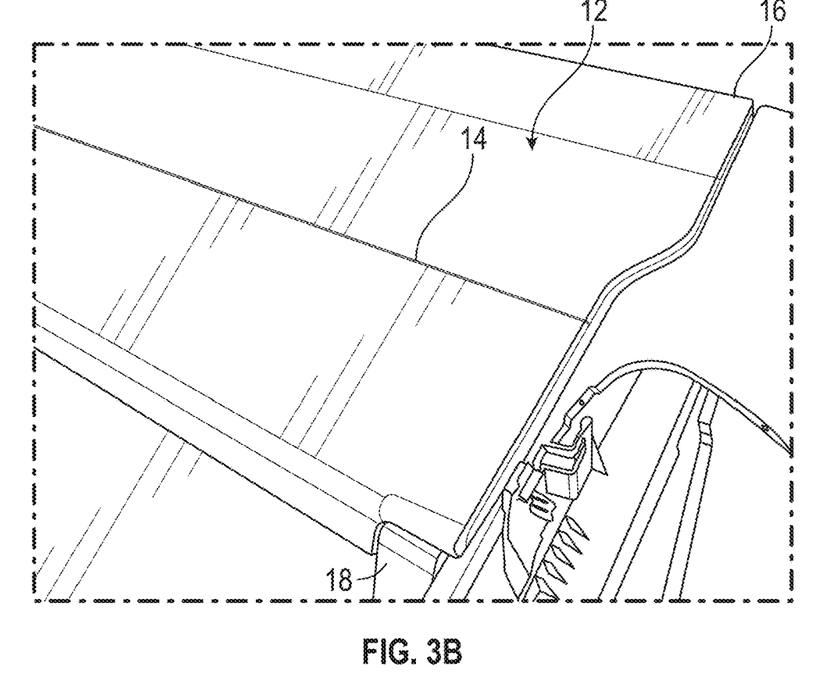
FIG. 3B is view of a portion of the powered cargo cover in a closed position.

Referring now to FIG. 1 is a perspective view of a rear portion 10 of a vehicle with a powered cargo cover 12 in accordance with an embodiment of the present disclosure is provided. The powered cargo cover 12 is capable of being moved from a closed position (FIGS. 1 and 3B) to an open position (FIGS. 2 and 3A). The powered cargo cover 12 is foldable about a hinge portion 14 and has a fixed pivoting end 16 as well as a movable end 18. The movable end 18 is secured to a cursor 20 that slidably moves along a rail 22 of an opening and closing mechanism or guide mechanism 24 of the powered cargo cover 12. In one embodiment, the cursor 20 slides along rail 22 due to a cable 26 or cables 26 each one of which is secured to the cursor 20 at one end and the other end is secured to a drum rotatably driven by a motor 28. As such and during rotation of the motor 28, the cursor 20 will slide along rail 22 in the directions of arrows 30.

Figure 4:
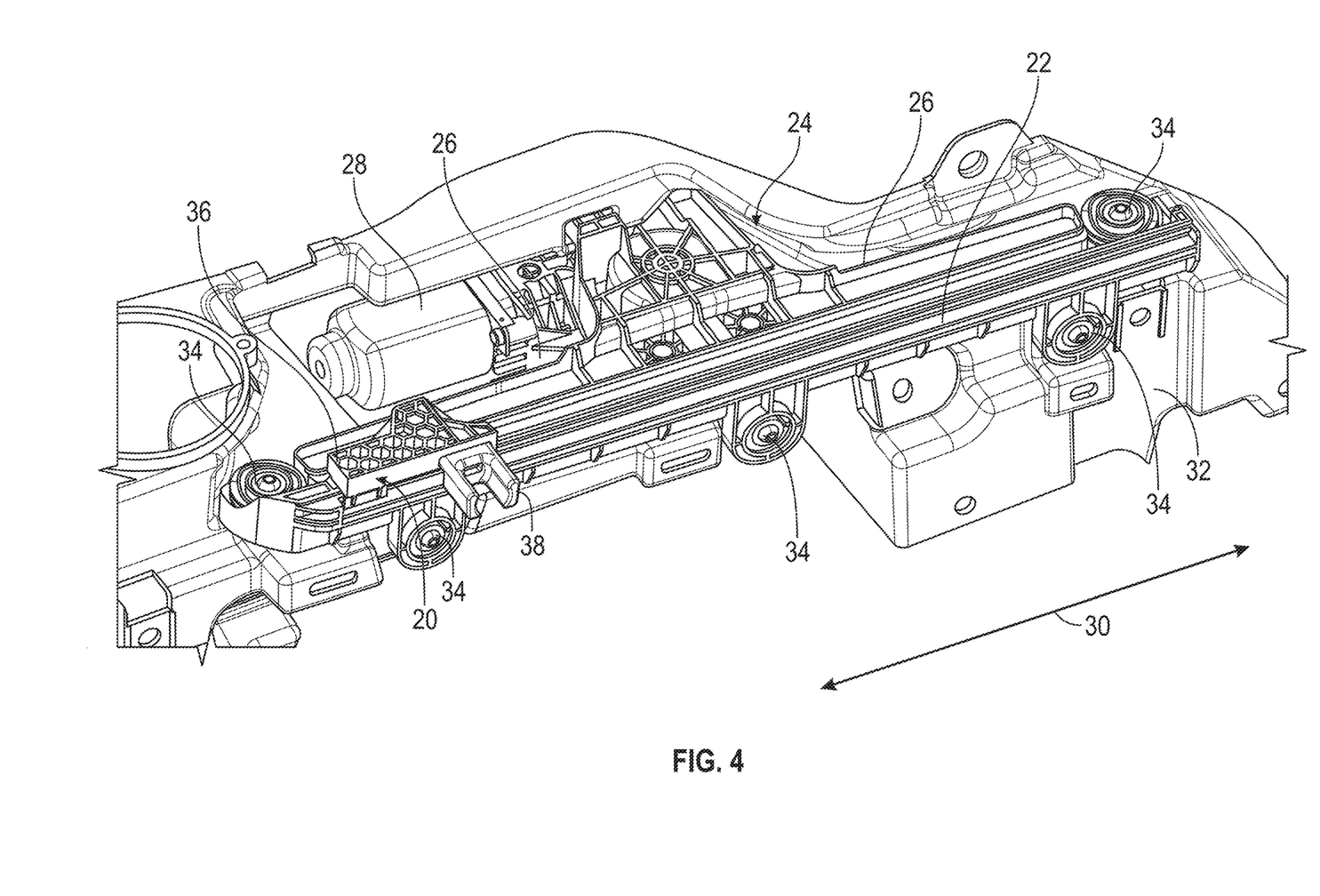
FIG. 4 is a view of a guide mechanism of the powered cargo cover.
Figure 5:
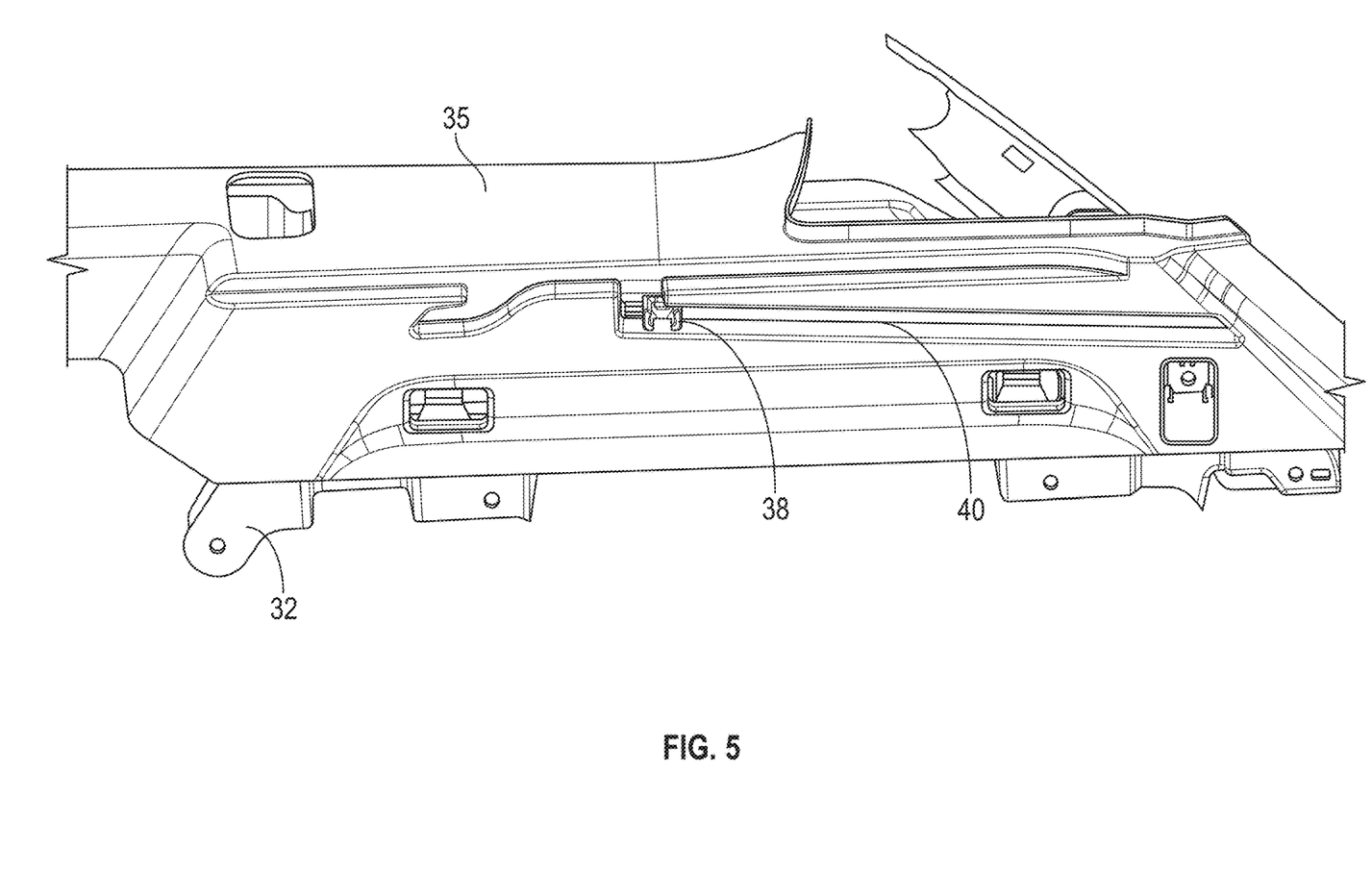
FIG. 5 is a view of a guide mechanism of the powered cargo cover.
Figure 6:
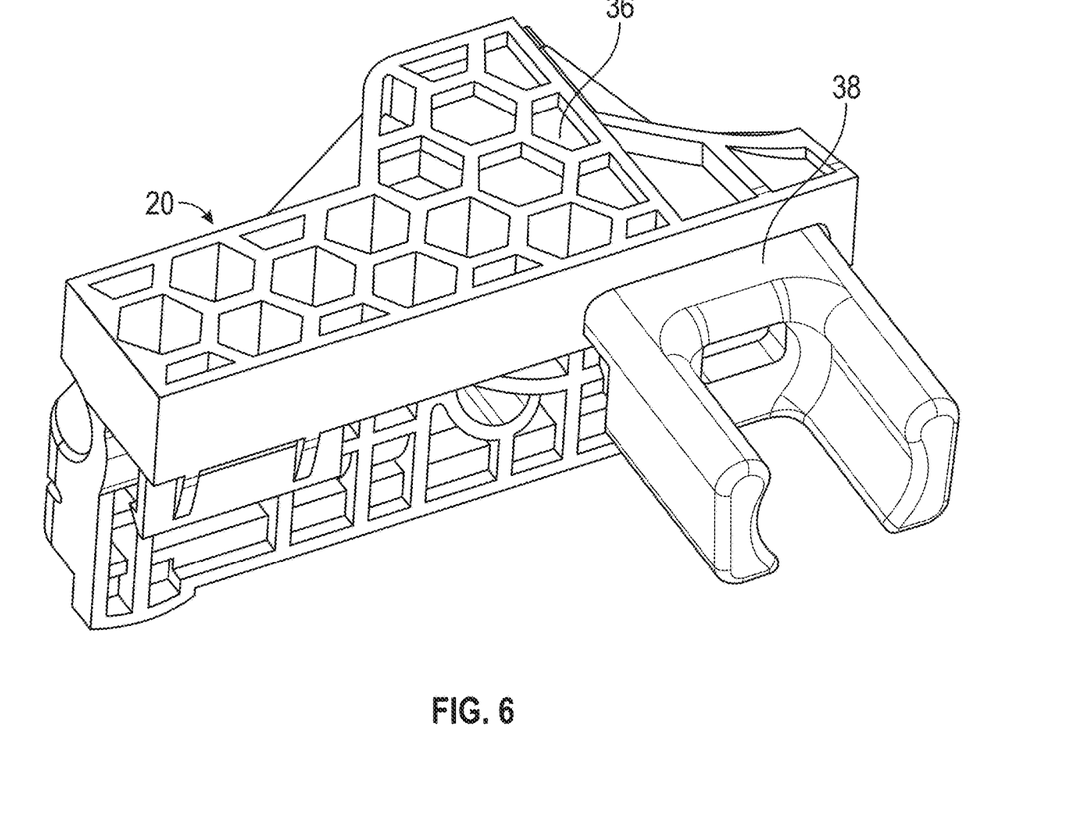
FIG. 6 is a view of a cursor of the guide mechanism of the powered cargo cover.
Figure 7:
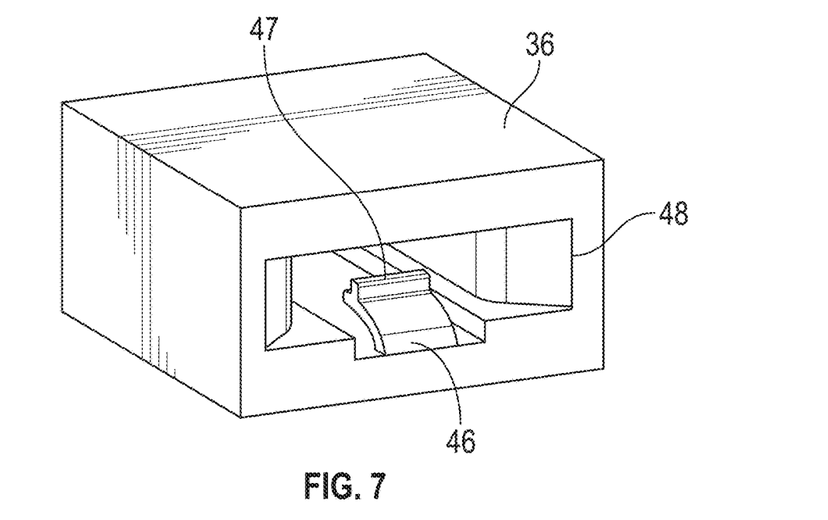
FIGS. 7 and 8 illustrate a two piece cursor contemplated for use with the guide mechanism of the powered cargo cover.
Figure 8:
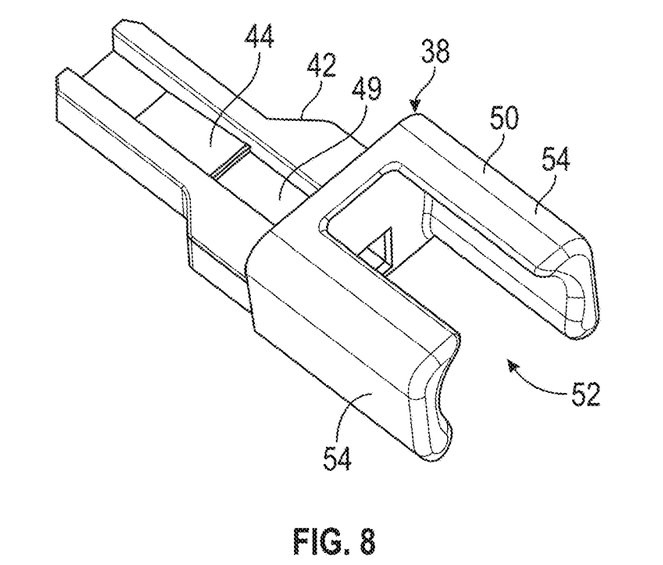
Figure 9:
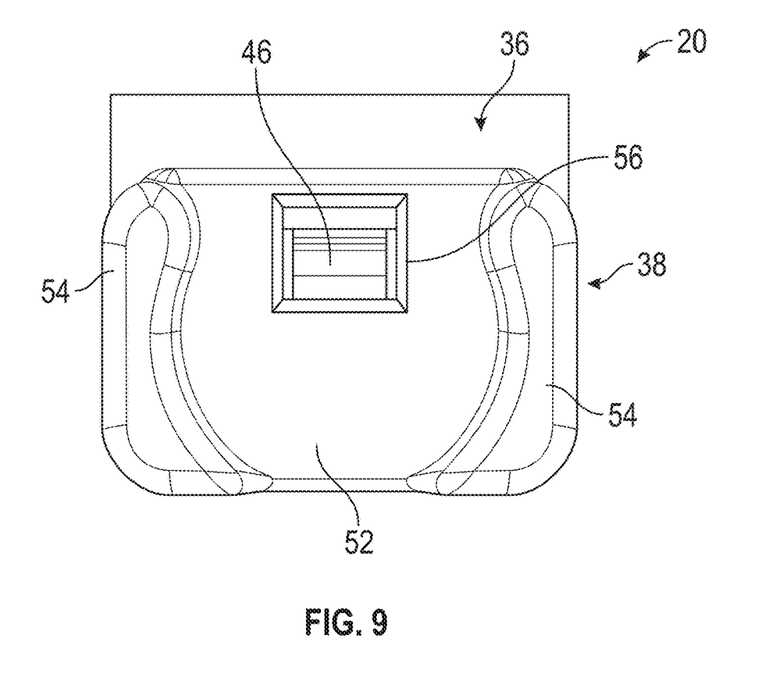
FIGS. 9 and 10 illustrate the two piece cursor in an assembled configuration.
Figure 10:
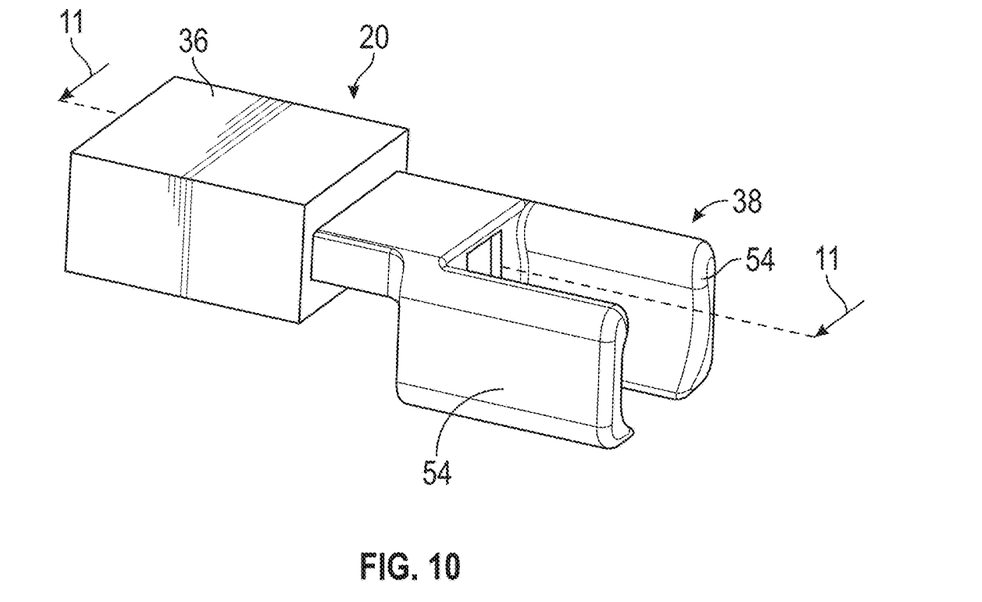
Figure 11:
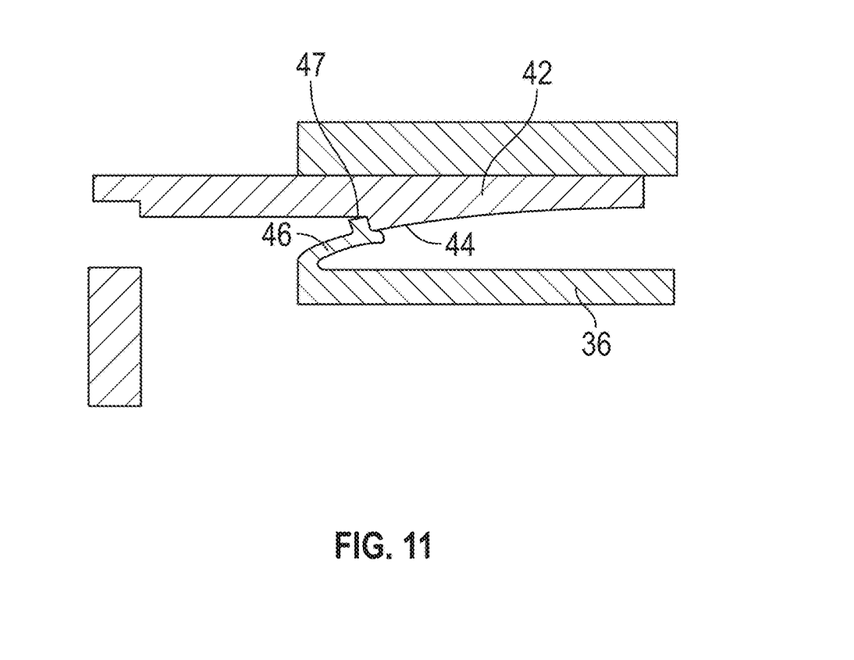
FIG. 11 is a view along lines 11-11 of FIG. 10.

FIG. 4 illustrates the rail 22 secured to a structural member 32 via fasteners 34 and FIG. 5 illustrates an interior trim portion 35 secured to the structural member 32 in order to provide an aesthetically pleasing surface as well as provide a cover to the opening and closing mechanism 24. In one embodiment, the cursor 20 is of a two piece construction wherein the cursor 20 includes a main body portion 36 and a nozzle portion 38. The two piece construction allows the main body portion 36 of the cursor 20 to be separately secured to the rail 22 and if necessary allows for removal and/or replacement of the nozzle portion 38 without completely removing the entire cursor 20 as well as may negate the need to remove the interior trim portion 35 during removal or installation of the nozzle portion 38. Furthermore, the two piece construction of the cursor 20 may allow the nozzle portion 38 to be secured to the main body portion 36 after the interior trim portion 35 has been secured to the structural member 32. As illustrated in at least FIGS. 1-5, the movable end 18 of the powered cargo cover 12 is secured to cursor 20 via the nozzle portion 38 that is removably secured to the main body portion 36 of the cursor 20. The nozzle portion 38 is configured to pivotally receive a portion of the moveable end 18 of the powered cargo cover 12.

As illustrated in at least FIG. 5, the nozzle portion 38 via movement of the main body portion 36 of the cursor 20 will slide in a track or feature 40 of interior trim portion 35. In one embodiment, the nozzle portion 38 is removably secured to the main body portion 36 of the cursor 20.

FIGS. 7-11 illustrate one embodiment wherein the nozzle portion 38 engages the main body portion 36 of the cursor 20 via a "snap fit" or interference type of engagement. In one embodiment, the nozzle portion 38 will have an engagement portion 42 that is configured to have a feature 44, which engages a tab 46 of the main body portion 36 when the engagement portion 42 is inserted into an opening 48 of the main body portion 36 of the cursor 20. In one embodiment, the tab 46 is made from a material having resilient characteristics such as plastic or any equivalent material. In addition and in one embodiment, the tab 46 may have a hook or protrusion 47 that engages feature 44 when the engagement portion 42 is inserted into an opening 48 of the main body portion 36 of the cursor 20. In addition and in one non-limiting embodiment, the main body portion 36 and the nozzle portion 38 of the cursor 20 may be formed from an easily moldable material such as plastic or any other equivalent materials.

The nozzle portion 38 will also have a cover engagement portion 50 that defines a receiving area 52 configured to pivotally receive a portion of the cover 12. In one embodiment, the cover engagement portion 50 may comprise a pair of opposing walls 54 each having a curved surface for pivotally receiving a portion of the cover 12. In one embodiment, the portion of the cover 12 that is pivotally received in the receiving area 52 is a pin or other equivalent device capable of rotating or pivoting in the receiving area 52 as well as providing translational or linear movement to the cover 12 as the cursor 20 slides along the rail 22.

In one embodiment, the nozzle portion 38 further comprises an opening 56 that extends into and from the receiving area 52. Opening 56 allows tab 46 to be dislodged from feature 44 via a tool that is inserted into opening 56 when nozzle portion 38 is secured to the main body portion 36. In one non-limiting embodiment, the feature 44 may be located in a slot 49 of the engagement portion 42 so that a tool may be inserted into opening 56 and engage tab 46.

Figure 12:
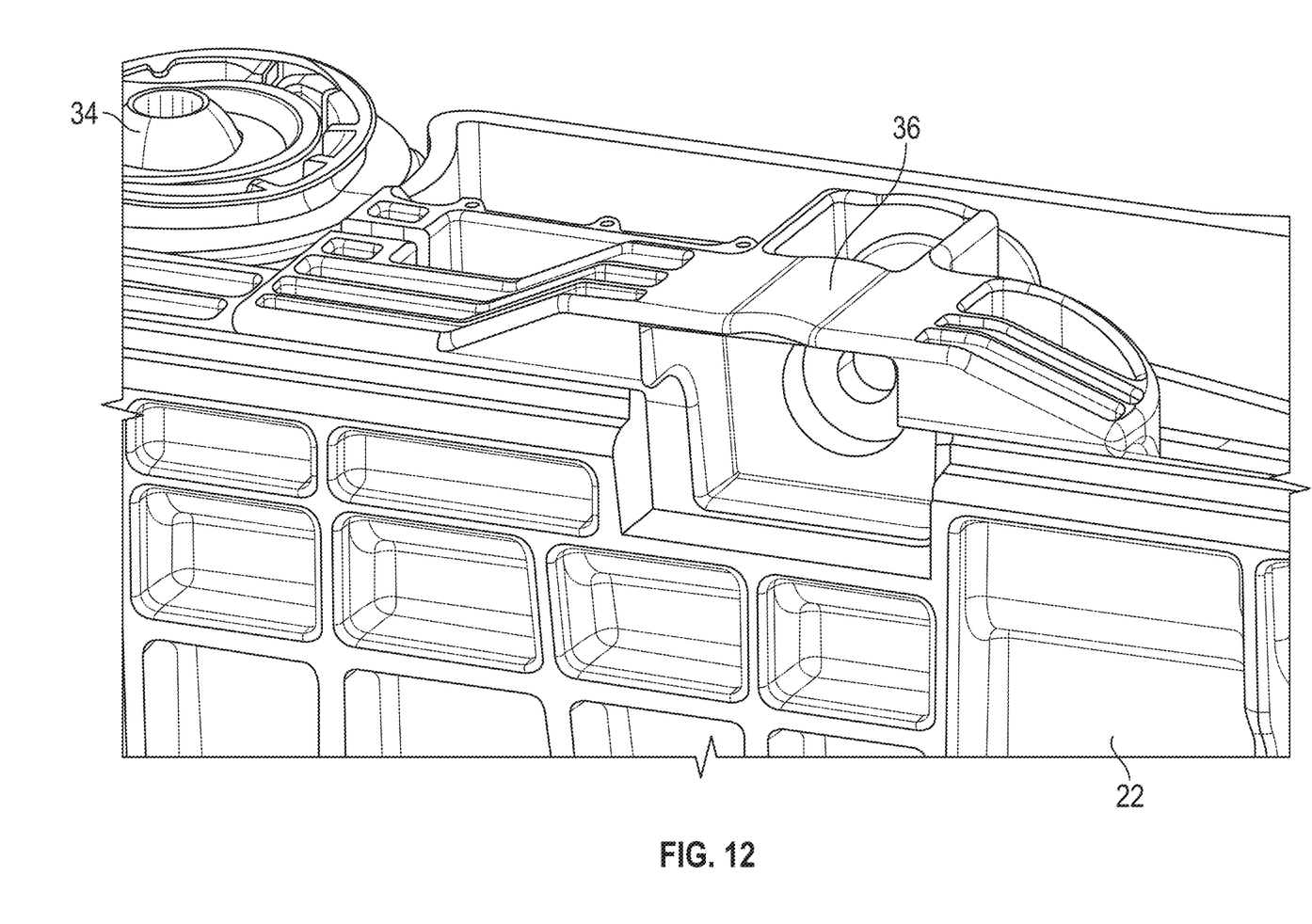
FIG. 12 is view of a portion of a guide mechanism in accordance with an alternative embodiment of the present disclosure.
Figure 13A:
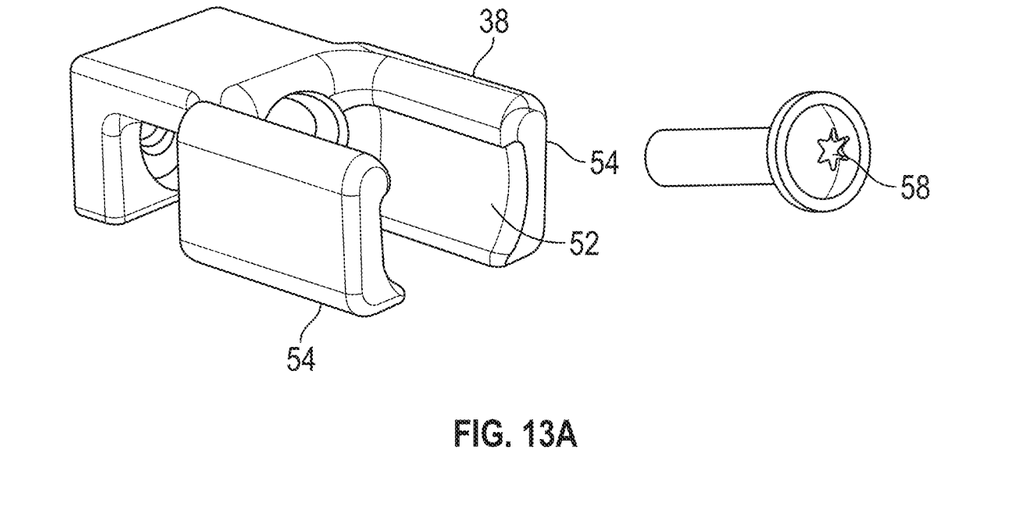
FIGS. 13A and 13B illustrate a two piece cursor in accordance with an alternative embodiment and contemplated for use with the guide mechanism illustrated in FIG. 12.
Figure 13B:
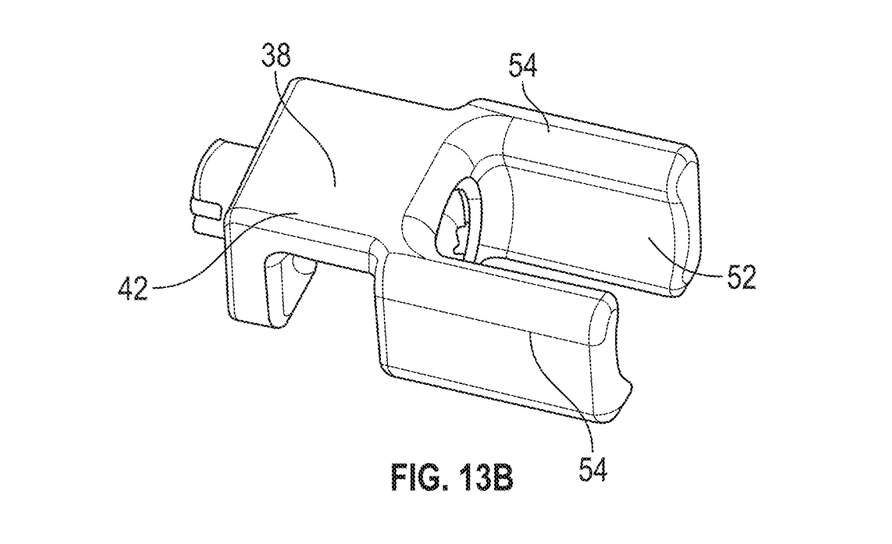
Figure 14:
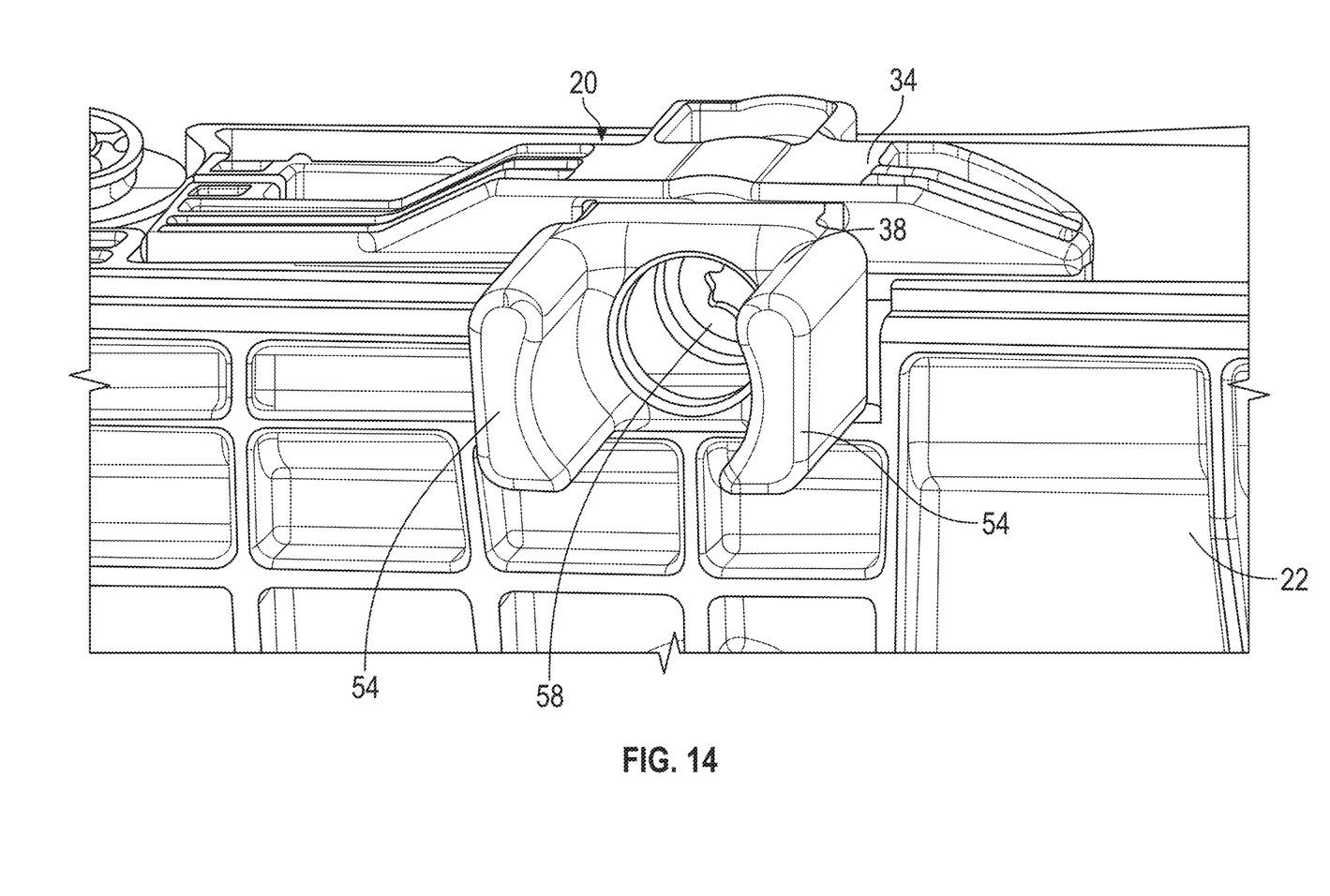
FIG. 14 illustrates the two piece cursor of the embodiments of FIGS. 12, 13A and 13B in an assembled configuration.

Referring now to FIGS. 12-14 an alternative embodiment of the present disclosure is provided. In this embodiment, the nozzle portion 38 is secured to the main body portion 36 via a screw 58. As such, a two piece cursor 20 is provided by securing the nozzle portion to the main body portion via usage of a fastening mechanism such as screw 58, which threadingly engages an opening in the main body portion 36.

Figure 15A:
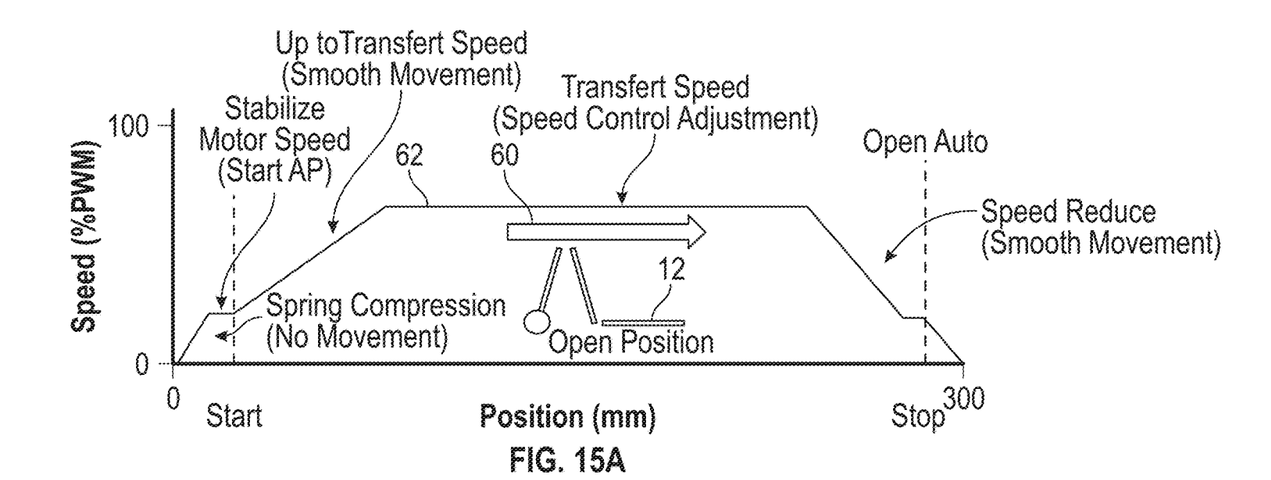
FIGS. 15A and 15B are graphs illustrating pulse width modulation of the moto of a powered cargo cover in accordance with an embodiment of the present disclosure.
Figure 15B:
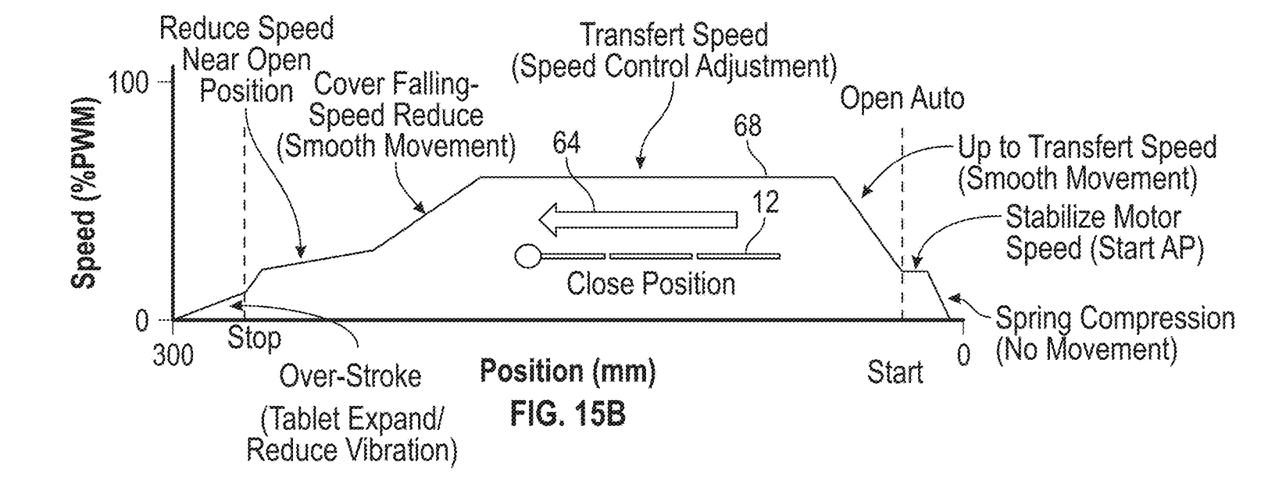

Referring now to FIGS. 15A and 15B and in order to control the speed of the motor 28 during an opening and closing of the cover 12 is controlled via pulse width modulation PWM of the motor 28. As is known in the related arts, pulse width modulation may be used to control the speed of a motor. During control of the motor via pulse width modulation the amplitude of the motor voltage remains constant so the motor is always as full strength. This allows the motor to be rotated much more slowly without it stalling. In FIG. 15A as graph is provided which illustrates opening of the cover 12 by applying a force in the direction of arrow 60. The graph illustrates the speed of the motor versus its position in millimeters during an opening event. The change of speed via pulse width modulation versus the positon of the cover 12 is illustrated by line 62. As can be seen the speed of the motor 28 gradually increases during the beginning of the opening event and then the speed is stabilized until it gradually decreases when the cover 12 approaches its fully open position. Also illustrated in FIG. 15A is that pulse width modulation is used to control the motor 28 speed during the entire opening event.

In FIG. 15B as graph is provided which illustrates closing of the cover 12 by applying a force in the direction of arrow 64 which is opposite to the direction of arrow 60. The graph illustrates the speed of the motor versus its position in millimeters during a closing event. The change of speed via pulse width modulation versus the position of the cover 12 is illustrated by line 68. As can be seen the speed of the motor 28 gradually increases during the beginning of the closing event and then the speed is stabilized until it gradually decreases when the cover 12 approaches its fully closed position. At the end or stop position an overstroke to the motor 28 may be applied to create a tensile force in the cover 12 in order to prevent rattling or vibration of the cover 12 when it is in the closed positon. In one non-limiting embodiment, the applied tensile force applied may be greater than 20N and less than 60N. Of course, forces greater or less than the aforementioned values or ranges are considered to be within the scope of the present application. Also illustrated in FIG. 15B is that pulse width modulation is used to control the motor 28 speed during the entire closing event.

Through the use of pulse width modulation improved smoothness of powered cover 12 is provided. In addition, the mechanical constraint on the system is reduced by using pulse width modulation PWM in order to control the motor 28 speed all along the movement of the cover 12. As illustrated in at least FIGS. 15A and 15B, the pulse width modulation PWM sequencing will be different during opening or closing event of the cover 12.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A two piece cursor for use with a powered cargo cover of a vehicle, comprising:
    a main body portion; and
    a nozzle portion removably secured to the main body portion, the nozzle portion having an engagement portion that has a feature that releasably engages a tab of the main body portion when the engagement portion is inserted into an opening of the main body portion, the nozzle portion further including a cover engagement portion that defines a receiving area configured to pivotally receive a portion of a movable end of the powered cargo cover, the nozzle portion having an opening that extends into and from the receiving area, the opening allows the tab to be dislodged from the feature via a tool that is inserted into the opening when the nozzle portion is secured to the main body portion.

2. The two piece cursor as in claim 1, wherein the main body portion is separately secured to a rail.

3. The two piece cursor as in claim 2, wherein the nozzle portion can be removed from the main body portion without completely removing the two piece cursor from the rail.

4. The two piece cursor as in claim 1, wherein the nozzle portion engages the main body portion of the cursor via a "snap fit" or interference type of engagement.

5. The two piece cursor as in claim 1, wherein the cover engagement portion includes a pair of opposing walls each having a curved surface for pivotally receiving the portion of the moveable end of the powered cargo cover.

6. An opening and closing mechanism for a powered cargo cover, comprising:
    a rail;
    a two piece cursor for securement to the powered cargo cover, the two piece cursor comprising:
        a main body portion slidably mounted to the rail; and
        a nozzle portion removably secured to the main body portion, the nozzle portion having an engagement portion that has a feature that releasably engages a tab of the main body portion when the engagement portion is inserted into an opening of the main body portion, the nozzle portion further including a cover engagement portion that defines a receiving area configured to pivotally receive a portion of a movable end of the powered cargo cover, the nozzle portion having an opening that extends into and from the receiving area, the opening allows the tab to be dislodged from the feature via a tool that is inserted into the opening when the nozzle portion is secured to the main body portion; and
    a motor for moving the two piece cursor along the rail, wherein movement of the two piece cursor along the rail moves the powered cargo cover between an open position and a closed position.

7. The opening and closing mechanism as in claim 6, wherein the powered cargo cover is foldable about a hinge portion.

8. The opening and closing mechanism as in claim 6, wherein the two piece cursor slides along the rail due to a cable or cables secured to the two piece cursor.

9. The opening and closing mechanism as in claim 6, wherein a speed of the motor during opening and closing of the powered cargo cover is controlled via pulse width modulation.

10. The opening and closing mechanism as in claim 6, wherein the powered cargo cover is located at a rear portion of a vehicle.

* * * * *